Aug. 2, 1927.
A. H. SINGELMANN
1,637,966
SELF LUBRICATING BEARING
Filed June 26, 1924
2 Sheets-Sheet 1
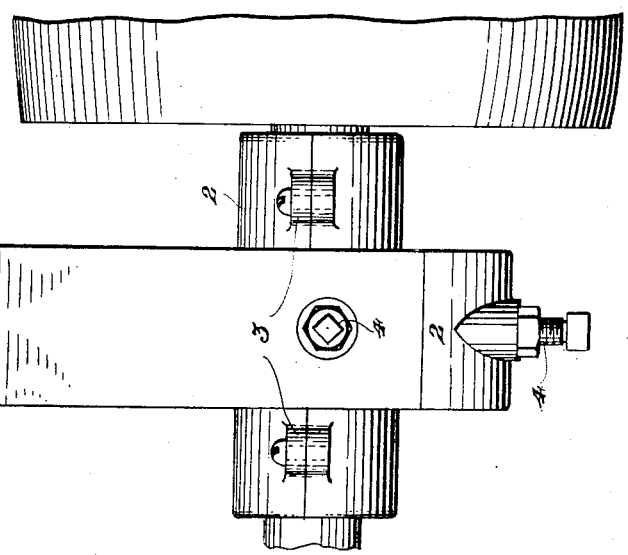
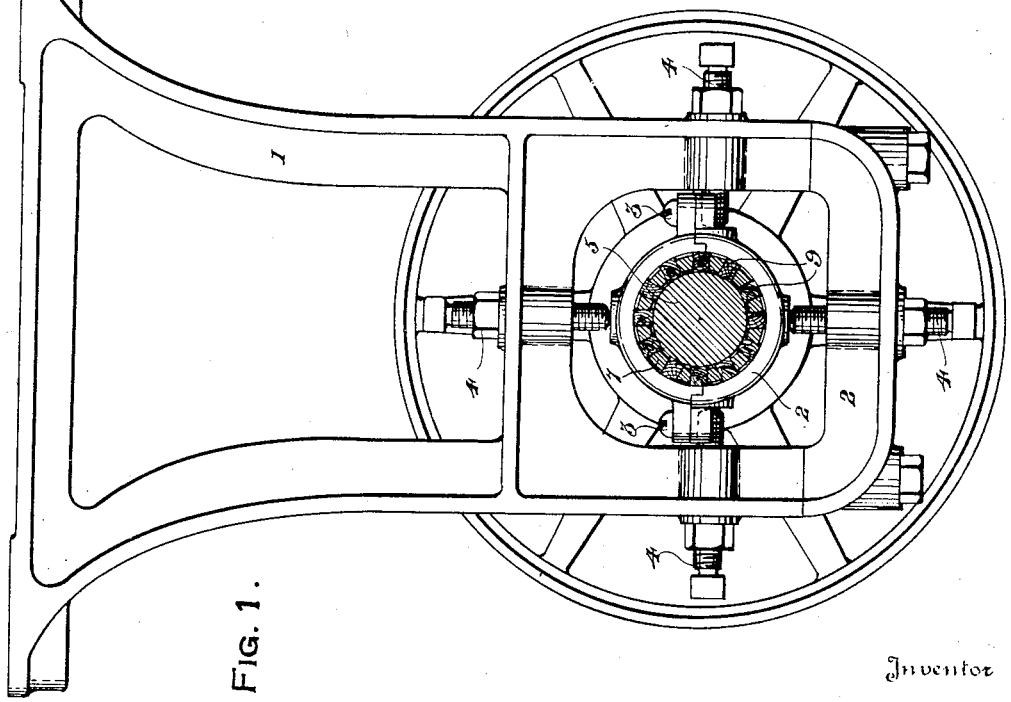
Inventor
A. H. Singelmann
By F. N. Bryant,
Attorney.

Aug. 2, 1927.
A. H. SINGELMANN
1,637,966
SELF LUBRICATING BEARING
Filed June 26, 1924  2 Sheets-Sheet 2
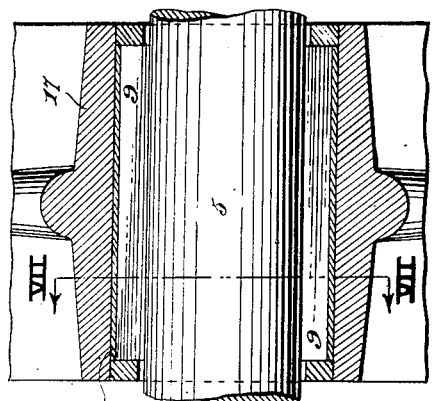
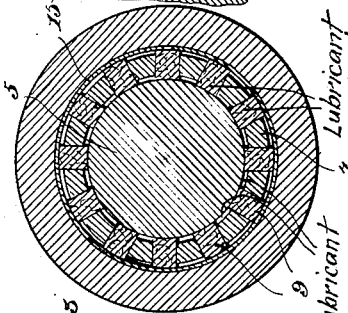
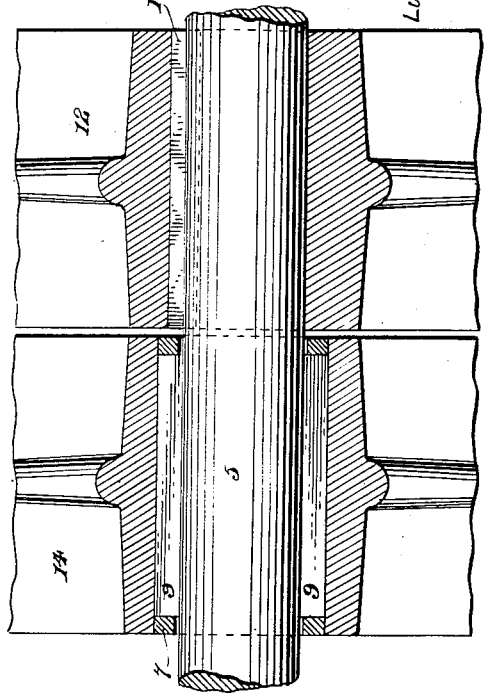
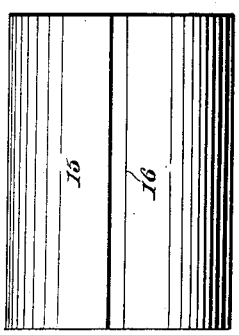
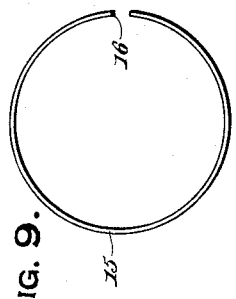
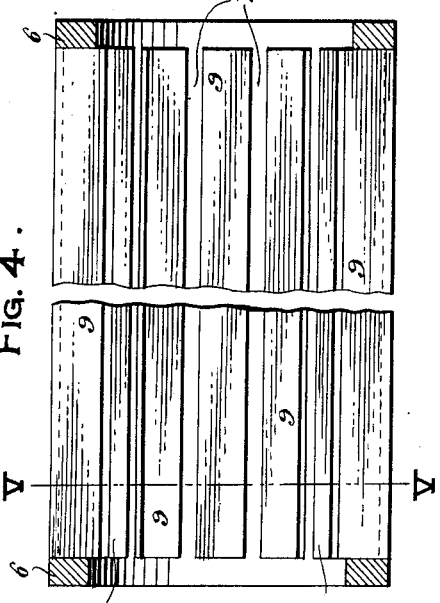
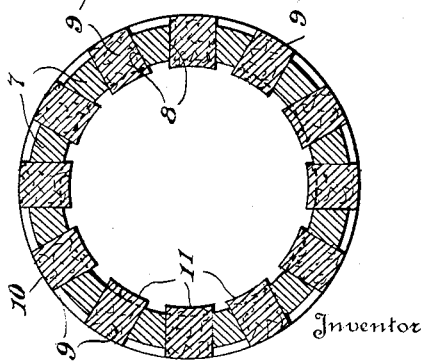
Inventor
A. H. Singelmann
By F. D. Bryant,
Attorney.

Patented Aug. 2, 1927.

1,637,966

UNITED STATES PATENT OFFICE.

ADOLPH H. SINGELMANN, OF NEWBURGH, NEW YORK.

SELF-LUBRICATING BEARING.

Application filed June 26, 1924. Serial No. 722,501.

This invention relates to certain new and useful improvements in self-lubricating bearings and has for its primary object to provide a bearing for axles, pulleys, castings and the like wherein a plurality of wooden strips or bars are interposed between a shaft and a wheel hub or the like and with a lubricant preferably formed of a mixture of graphite and oil covering the bearing bars or strips and substantially filling the spaces between the strips to provide a self-contained lubricating bearing with a minimum of wear upon the working faces of the wooden strips.

A further object of the invention is to provide a bearing of the type above set forth wherein the wooden bearing strips are cut in a manner for positioning the ends of the grain of the strip perpendicular to the longitudinal axis of the shaft with which the strips are associated for reducing wear thereon.

A still further object of the invention is to provide a self-lubricating bearing wherein a bearing cage formed of end rings connected by longitudinally extending spaced rods has a plurality of wooden bearing strips interposed between the rod with the inner wooden faces thereof projecting inwardly of the inner faces of the end rings for contacting a supporting shaft or the like and with a liner enclosing the bearing for retaining the bearing strips in position and also capable of accomplishing an adjustment thereof due to wear upon the inner working faces of the several strips.

With the above and other objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a side elevational view of a shaft hanger with the bearing thereof shown in cross-section and illustrating the wooden bearing strips of the bearing cage engaging the periphery of the supporting shaft, Figure 2 is an edge elevational view of the hanger, Figure 3 is a fragmentary longitudinal sectional view showing cooperating loose and fixed pulleys mounted upon a shaft with the bearing forming the basis of this application interposed between the loose pulley and the shaft, Figure 4 is a longitudinal sectional view of the bearing cage and wooden strip supported therein, Figure 5 is a cross-sectional view taken on line V—V of Fig. 4, Figure 6 is a fragmentary longitudinal sectional view showing a liner enclosing the wooden strips of the bearing, Figure 7 is a cross-sectional view taken on line VII—VII of Fig. 6, Figure 8 is a side elevational view of the split liner, and Figure 9 is an end elevational view of the liner.

The invention as illustrated in Figs. 1 and 2 is associated with the hanger 1 that has a two-part bearing member 2 secured together as at 3 and retained in the hanger by the adjusting screws 4 as shown in Fig. 1.

A bearing cage of the type illustrated in Figs. 4 and 5 is associated with the two-part bearing member 2 and the shaft 5 extending through the two-part bearing member, the cage including end rings 6 connected together by circumferentially spaced rods 7 that have their opposite faces tapered as at 8 as clearly illustrated in Fig. 5 with the adjacent faces of spaced rods extending parallel to each other for substantially frictionally engaging the opposite faces of the wood bearing strips 9. The outer faces of the strips are arched as at 10 coincident to the curvature of the end rings 6 while the inner faces of the wooden strips 9 are arched as at 11 for engaging the circular periphery of the shaft 5. The bearing cage carrying the wooden bearing strip is interposed between the two-part bearing 2 and the shaft 5 as illustrated in Fig. 1 with the inner projecting ends of the bearing strips 9 having their inner curved faces 11 contacting the shaft. A suitable lubricant, such as a mixture of graphite and oil covers the bearing strip 9 and fills the vacant spaces between the bearing strip so that the bearing will properly function for a considerable length of time without the necessity of applying an additional lubricant thereto. The bearing strips 9 being formed of wood, the same are cut in a manner to dispose the ends of the grain of the wooden strips perpendicular to the longitudinal axis of the shaft 5 to reduce to a minimum wear upon the working faces of the bearing strip and for prolonging the life thereof. Where the bearing is employed with a shaft hanger as herein described, prolonged use thereof might cause slight wear upon one side of the bearing due to excessive strains of the belt pulley and to compensate for such wear, the bearing may be adjusted by partially rotating the same in either direction and present unworn faces to that side of the bearing receiving the severest strains.

The bearing is illustrated in Fig. 3 as employed in connection with fixed and loose pulleys, the fixed pulley 12 being keyed as at 13 to the shaft 5 while the loose pulley 14 is freely rotatable upon the shaft with the bearing cage illustrated in Figs. 4 and 5 interposed between the pulley 14 and shaft 5 as clearly illustrated.

It is also intended that a liner be employed in connection with this bearing as illustrated in Figs. 6 to 9 wherein the circular band 15 longitudinally split as at 16 is placed in enclosing relations with the outer arched faces 10 of the wooden strips between the end rings 6 as illustrated in Fig. 6 and engaging the bore of the pulley or wheel 17, the liner 15 retaining the wooden strips 9 in engagement with the shaft 5 as will be obvious from an inspection of Fig. 7. Should the wooden strips become worn, a liner of different dimensions may be employed for further moving the bearing strips 9 toward the shaft 5 to insure proper engagement thereof with said shaft.

From the above detail description of the device, it is believed that the construction and operation thereof will at once be apparent, it being noted that the bearing is self-lubricating by the fact that the wooden strips 9 are thoroughly covered with a lubricant while the faces between the strips are filled with the lubricant so that additional oiling thereof is unnecessary. By the provision of liners of different dimensions, wear of the wooden strips is compensated for by adjustment of the liner as above described, and while there are herein shown and described the preferred embodiments of the present invention, it is nevertheless to be understood that minor changes may be made therein without departing from the spirit and scope of the invention as claimed.

What I claim as new is:—

1. A shaft bearing comprising a skeleton cage through which the shaft passes, said cage embodying a pair of spaced rings and a circular series of rods rigidly connecting said rings and arranged in uniformly spaced parallel relation, radially slidable bearing strips fitted in the spaces between the rods and projecting inwardly of the rods and the rings with their inner longitudinal edges conforming to and engaging the shaft, the outer edges of said rods being inwardly of the outer peripheries of said rings and the outer edges of said bearing strips, and a band encircling the bearing strips between the rings to maintain said bearing strips in engagement with the shaft.

2. A shaft bearing comprising a skeleton cage through which the shaft passes, said cage embodying a pair of spaced rings, and a circular series of rods rigidly connecting said rings and arranged in uniformly spaced parallel relation, radially slidable bearing strips fitted in the spaces between the rods and projecting inwardly of the rods and the rings with their inner longitudinal edges conforming to and engaging the shaft, the outer edges of said rods being inwardly of the outer peripheries of said rings and the outer edges of said bearing strips, a band encircling the bearing strips between the rings to maintain said bearing strips in engagement with the shaft, said bearing strips being of hard wood with the grains thereof extending radially of the bearing and the ends of the grains thereof presented at the inner longitudinal edges of the bearing strips to the shaft.

In testimony whereof I affix my signature.

ADOLPH H. SINGELMANN.